April 29, 1941.                C. D. ADAMS                2,240,167
                            SUCTION SEPARATOR
                            Filed May 24, 1937
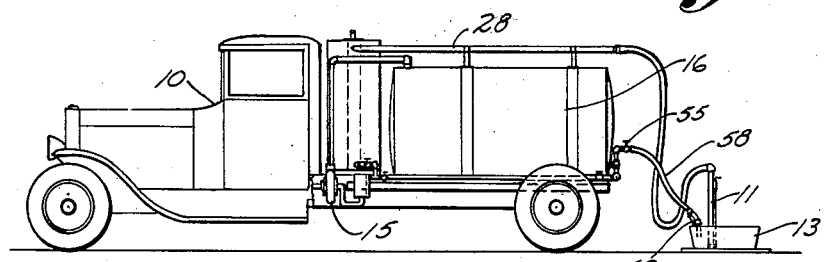
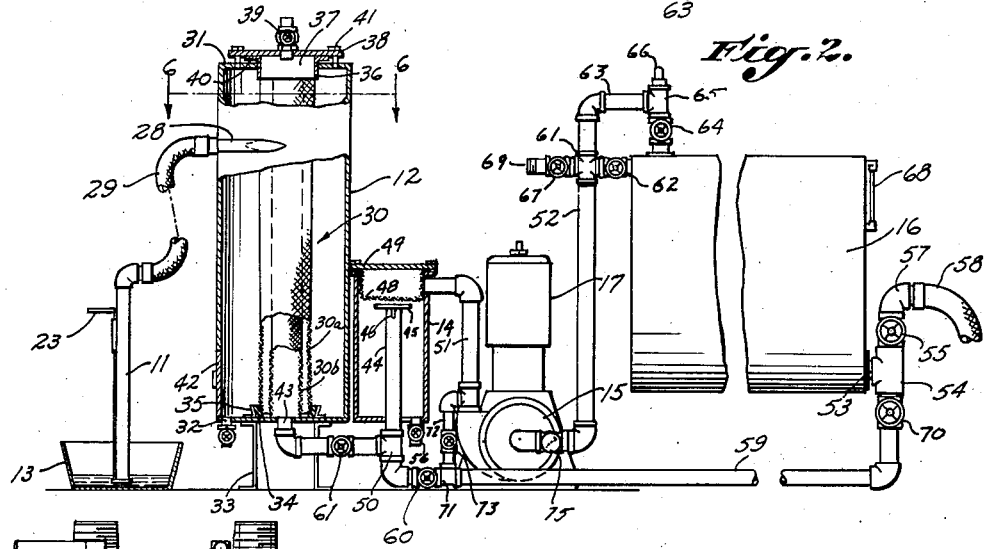
INVENTOR.
Charles D. Adams,
BY Robert M. Fulwider
ATTORNEY.

Patented Apr. 29, 1941

2,240,167

UNITED STATES PATENT OFFICE 2,240,167

SUCTION SEPARATOR

Charles D. Adams, Los Angeles, Calif.

Application May 24, 1937, Serial No. 144,466

4 Claims. (Cl. 210—44)

My invention relates generally to apparatus for removing mixtures of liquid and solids from receptacles and separating the liquid from the solids, and liquids of different specific gravities from each other so that desirable substances may be thus reclaimed or salvaged. More particularly my invention has reference to portable apparatus especially adapted for removing oil and sediment from tanks and other receptacles such as smudge pots, oil storage tanks, and the like.

One important use for my apparatus is in the cleaning and reclaiming of oil from orchard heaters or "smudge pots," which are extensively used for protecting orchards and other crops against damage due to sub-normal temperatures. The fuel generally used in these heaters is crude oil, of the least expensive kind, usually having an asphalt base, which upon burning leaves a sludge or thick deposit in the pots. If a large number of pots are used, it involves a large expense in labor to clean them manually, even when they are only cleaned occasionally.

On the other hand, if the pots are not periodically cleaned, their fuel capacity is reduced, and they have to be filled oftener, and further, manual cleaning does not afford any chance to separate the detritus or residue in the pots from the oil mixed therewith, nor is it possible to dump the mixture taken out of the pots in the orchard itself, as this reduces the fertility of the ground, and may in fact kill the trees.

The mere firing or lighting of a couple of thousand smudge pots in itself, requires considerable labor, the filling of them with oil requires still more time, and the cleaning operation requires a still greater amount of time and labor if performed manually. It will be understood that the pots occupy definite positions in an orchard being arranged to supply sufficient heat to protect the fruit, with due consideration being given to the prevailing winds, and are usually left in the orchard for the entire period that sub-normal temperatures are expected.

It can be readily appreciated that a pot from which the cover is periodically removed filled with oil and positioned under or between trees, will accumulate and add to its oil content a large and miscellaneous variety of substances other than oil, and many of which are not combustible such as leaves, twigs, insects, dust, dirt, small stones, water, etc. Such substances when combined with crude oil and standing over a considerable period when firing of the pots is not necessary, produce a mixture which vitiates the burning qualities of the oil, reduces the fuel capacity of the pots and is a direct cause of oil waste.

The objects of my invention are first to provide portable apparatus by means of which it is possible to expeditiously clean all the pots in a large orchard, and at the same time separate or reclaim all the free oil, and a considerable portion of the oil which is combined with foreign matter, refill certain of the pots with this reclaimed oil, and finally carry away and dump the dirt and other foreign matter taken from the pots in a place where it will not be harmful to the orchard.

A further object of my invention is to provide an apparatus of the character described which will also have a general utility in removing and reclaiming oils and other liquids from tanks of various kinds and descriptions.

To these ends, my improved apparatus comprises the various parts, in correlation as shown in the drawing herewith, in which Fig. 1 is a side elevation of the complete apparatus mounted on an automobile truck.

Fig. 2 is a diagrammatic elevation, partly in section of my improved apparatus only.

Fig. 3 is an enlarged partial side elevation of the upper portion of the foot pipe, showing the hand control.

Fig. 4 is an enlarged elevation of the movable suction nozzle or foot pipe showing a special foot valve for retaining, and allowing the suction vacuum to be built up between the successive pot cleaning operations.

Fig. 5 is a horizontal cross-section of the movable suction pipe taken on the line 5—5 of Fig. 4, and Fig. 6 is a horizontal cross-section of the separating tank 12 taken on the line 6—6 of Fig. 2.

In the preferred embodiment of my invention, the apparatus may be mounted on a truck 10, or other suitable conveyance such as a trailer, wagon, or the like.

The cleaning and separating apparatus proper, consists of a foot pipe or contact member 11 whose lower end may be placed in a smudge pot 13, a separating tank 12, a sediment tank 14, a suction pump 15, and an oil storage tank 16, all of these parts being preferably mounted on the truck 10 or on a frame or base which can be removably mounted on the truck.

As shown in Fig. 1, the pump 15 is indicated as being driven from a power take off operated by the truck motor, but in Fig. 2 I show a separate smaller motor 17 for driving the pump, which latter motor may be an air cooled motor which with the pump 15 forms a unitary structure.

This construction has a number of advantages as follows:

1. The pump motor 17 may be of a simple self-governing type which will maintain a substantially uniform speed under varying demand from the pump.

2. The size of the motor 17 may be in correct relation to the size of the pump, thus saving fuel in operation, and avoiding the continuous use of the larger truck motor.

3. In case of trouble with the pump, or its motor, a duplicate unit may be substituted, or if the outfit is a large one used for operation in a number of orchards, two independent pumping units may be incorporated therein, and either may be used at will or both may be used together.

The pump 15 itself may be any one of numerous commercial forms of rotary pump which will produce a strong vacuum or suction effect suitable for the intended purpose, and it should also be of a type which may be operated at high speed in order to be compact and light in weight.

When the pump 15 is in operation, it will produce a partial vacuum in the separating tank 12, and in the foot pipe 11, and as the pump 15 preferably works continuously as the foot pipe 11 is passed from pot to pot, it is of great advantage to adequately seal the end of the foot pipe 11 so that the pump 15 may continue to build up the vacuum in the tank 12 as the foot pipe 11 is transferred from one smudge pot 13 to the succeeding one.

In order to accomplish this, I provide a flat metal foot valve 18, which may be securely fastened to the lower end of a rod 19, and carry a sealing gasket 20 of leather, rubber, or any suitable composition on its upper face and suitably secured thereto. When the valve 18 is closed, as shown in Fig. 4, the gasket 20 is in close contact with the lower end of the foot pipe 11, and effectively seals it against the entrance of air, thus permitting the pump 15 to reduce the air pressure in the tank 12 a further amount between the cleaning operations, and in readiness for the next operation.

The valve rod 19 may be supported by a lower bearing 21 and an upper bearing 22, these bearings being formed on or secured to the foot pipe 11, and the rod 19 may also be provided at its upper end with a horizontally disposed handle 23 for operating the foot valve 18. Between the upper bearing 22, and the handle 23, and surrounding the valve rod 19 there may be placed a coiled helical spring 24 which is of ample strength to support the rod 19 and its attached parts.

The upper bearing 22 is preferably provided with a U-shaped slot 25, having two vertically disposed portions, and curved connecting portions, and which is engaged by a small pin 26 projecting into it from the rod 19.

When the lower end of the foot pipe 11 is introduced into the material in a smudge pot 13, so that this lower end is below the surface of the material, the handle 23 is depressed by the operator, thus lowering the valve 18 a small amount, say about ½", and then the handle 23 may be swung about 180°, and allowed to rise under the action of the spring 24 to a point such that the valve 18 will be in a position having its lower face about an inch higher than the lower end of the foot pipe 11, thus permitting this lower end of the foot pipe 11 to fully explore all portions of the smudge pot 13 to gather and remove the material therein. At the end of this gathering action, when all or most of the contents have been removed from the receptacle, the foot valve 18 is closed as quickly as possible and the constantly operating pump 15 continues to build up additional vacuum in the separating tank 12.

It will be noted that the valve structure just described for the foot valve 18 is economical to manufacture, convenient and effective in use and that it provides a clear and unobstructed opening for the full area of the foot pipe 11 thus effecting a maximum use of a pipe or any given size and, therefore, making the unit light and easily handled.

In order to prevent damage to the lower end of the foot pipe 11 by contact with the smudge pots 13, the lower end of the pipe 11 may be case hardened, or a short piece of hard steel pipe may be welded to its lower end as indicated by the dotted line at 27 in Fig. 4. The position of the valve 18 when closed is shown by full lines in Fig. 4, and the position when opened is shown by dotted lines.

The separating tank 12 is preferably vertical, and near its upper end a feed pipe 28 is provided which enters it tangentially, so that the velocity of the incoming material tends to throw the material around the outer wall of the tank and thus produce a separating effect between the mixed materials of differing weights.

The entrance or feed pipe 28 is connected to the foot pipe 11 by a flexible connecting member 29 such as a rubber or metallic hose, and preferably this hose is of a type suitable for sub-atmospheric pressures, and one not easily collapsed thereby. The length of the hose 29 may be such as to reach several adjacent smudge pots 13 before necessitating a change in the position of the truck 10.

Within the separating tank 12, there is placed a cylindrical vertically-disposed separating means, preferably in the form of a metallic screen 30 having numerous openings or perforations of a suitable size for the screening effect desired, and being mounted at the center of the tank 12, and preferably in parallel concentric relation thereto. As seen best in Fig. 2, I prefer to employ two concentric screens 30a and 30b, the outer screen 30a being of relatively coarse mesh, and the inner screen 30b being of relatively finer mesh, although in many instances a single screen is adequate.

A further reason for the tangential location of the feed pipe 28 consists in the fact that with such a location the entering material if solid matter such as gravel or small stones will not impinge directly on the screen 30, and damage it.

The separating tank 12 may be made in any suitable manner as metal with a welded top 31 and a similar welded bottom 32 and with or without supporting legs 33. The screen 30 may be provided with an annular bottom ring 34 to reinforce the same and the ring 34 may have a tapered or conical exterior surface to engage a fixed ring 35 secured to the bottom 32 of the tank 12, which latter has an interior tapered surface loosely engaging the ring 34.

At its upper end the screen 30 may be provided with an annular reinforcing ring 36 formed of a bent angle bar, and adapted to enter a circular opening 37 formed in the tank top member 31. A plate 38 may be welded to the angle ring 36 and have a nipple and valve 39 thereon for lifting the screen 30 out of the tank 12, and for admitting fluid to the inside of the screen for washing the same.

A ring gasket 40 made of rubber, leather, or other suitable material may be placed between the top plate 31 and the angle ring 36 to seal the joint, and this gasket may be tightened in place by suitable means such as stud bolts 41 secured to the plate 31.

At the base of the tank 12 one or more cleaning doors 42 may be provided for removing the collected waste matter therefrom. The door or doors 42 must be tightly sealed to prevent the ingress of air, and they may be mere cover plates, with a coacting gasket and secured by bolts similar to bolts 41, or the door 42 may be hung on double hinges having two sets of pins to allow the door to seat readily on its gasket. Such devices are in common use and need not be herein described in detail.

A discharge or drain pipe 43 is inserted in the bottom plate 32 of the tank 12 in a central position within the lower end of the screen 30. Matter which cannot pass through the screen 30 is retained in the annular space between the screen 30 and the surrounding outer wall of the tank 12 and accumulates therein until satisfactory operation of the apparatus is no longer possible, when it may be removed through the door 42. As the volume of this annular space may be made anything desired, a large amount of waste material may be allowed to accumulate and a large number of smudge pots or other receptacles may be cleaned before it becomes necessary to clean out the tank 12.

The drain pipe 43 above-mentioned is provided with a stop valve 61 and is connected to a T or other fitting 50 preferably disposed beneath the sediment tank 14. A pipe 44 leads from the T 50 up through the base of sediment tank 14 and terminates in the upper end of said tank. Suitable means such as baffle plate 45 and slots 46 on the upper end of pipe 44 are provided to cause the liquid flowing up and out of the pipe 44 to flow outwardly and downwardly in a manner to minimize turbulence in the sediment tank 14. A pipe 51 connects the pump 15 to the upper portion of tank 14 which is provided with suitable screening means 48 adapted to screen out such solid matter as may have passed through screen 30 in separating tank 12 and into the sediment tank 14. The top of sediment tank 14 is sealed by any convenient means such as cover plate 49 secured in place in any suitable manner.

As will be apparent, any water or other heavy liquid mixed with the oil drawn into the sediment tank will also settle to the bottom of tank 14 and may be drawn off through a suitable drain 56 in the lower portion of the tank. Thus it will be seen that the apparatus of my invention not only serves to separate solid material from the oil but also provides means for removing any water which may be mixed therewith.

A discharge pipe 52 is connected to the outlet side of pump 15 and terminates in a fitting 61 adjacent the top of storage tank 16. One side of the fitting 61 connects directly through a valve 62 to the upper portion of tank 16 and provides the normal passage for liquid passing through pipe 62. Another side of the fitting 61 has a pipe 63 connected thereto which leads up and over tank 16 and connects to the top thereon through a T 65 and valve 64, the other side of the T 65 being provided with a safety valve 66. The third side of fitting 61 is provided with a valve 67 and nipple 69 adapted to have a hose or pipe connected thereto. By having the storage tank 16 closed to the atmosphere it is possible to build up a pressure therein which greatly facilitates the flow of oil therefrom through hose 58. A gauge 68 of any suitable form may be provided for reading the tank pressures at all times.

At one end of the tank 16, preferably the rear end, a short pipe or nipple 53 may connect the tank to a T 54, and above the T 54 there may be placed a valve 55 and an adjacent elbow 57, from which a filling hose 58 may be led to a smudge pot to be supplied with oil. By placing a spring lever faucet 63 on the end of the hose 57 the operation of refilling a smudge pot with oil is facilitated.

Below the T 54 there may be placed another stop valve 70, from which a pipe 59 leads to a connection with a T 71 connected to valve 60, and also to a bypass pipe 72 which connects to the inlet side of the pump 15 through a valve 73.

In the normal operation of my apparatus, liquid is pulled or sucked up through foot pipe 11 into separator tank 12 and thence through sediment tank 14, pump 15, pipe 52 and valve 62 into storage tank 16. For this normal operation valves 61 and 62 are open and valves 60, 73, and 67 are closed. Valve 64 is also open so that tank 16 is in direct connection with the pop valve 66. When it is desired to withdraw oil from storage tank 16 for filling smudge pots or the like by gravity flow, the valve 55 is opened, (valve 70 being normally closed) and the oil is permitted to flow out through elbow 57 and hose 58.

If it is desired to transfer the contents of storage tank into another tank situated above storage tank 16, a hose is connected to nipple 69; valves 70, 73, and 67 are opened and valves 62 and 64 are closed, (valve 60 being already closed) and the pump 15 is started. Liquid is then drawn from tank 16 through T 54, valve 70, pipe 59, valve 73, and bypass 72 into the pump 15 and is discharged through pipe 52 valve 67 and nipple 69 to the tank or other receiving means for the liquid.

It will be noted that by connecting the safety valve 66 directly to pipe 52, it is impossible to ever build up excessive pressure in the piping or storage tank.

By providing the connection shown great flexibility of operation is secured. For instance, in addition to the operations above-mentioned, oil can be circulated through the sediment tank 14 if desired, by opening valve 60 and closing valve 61. Also oil from storage tank 16 may be used to prime the pump if needed by utilizing the bypass 72 as hereinbefore described.

It will be noted that the large pieces of foreign matter are caught and held in the separating tank 12 by the main screen 30, and that the finer particles which pass through the screen 30 are caught by the finer meshed flat screen 48 in the sediment tank 14, so that the pump 15 is protected against all foreign matter except the most minute particles, and that even these are intimately mixed with oil.

The above-described apparatus has proved itself in practice as being very efficient, convenient, and above all as a great labor saver. In addition, the amount of oil reclaimed from the foul smudge pots is substantial and in the aggregate when taken from a large number of pots becomes an important item of expense saved.

It will be apparent that various changes and rearrangements in the preferred form of my apparatus herein described may be made by those skilled in the art without departing from the scope of my invention as defined by the following claims. As an example, two separate pumping units may be provided, and on a large apparatus two separating tanks may be provided, and also a plurality of suction nozzles, and filling hoses, as desired, and an additional storage tank could be carried on a trailer, or the entire apparatus could be mounted on a vehicle or trailer to be pulled by a tractor.

I claim as my invention all the patentable subject matter included in the following claims:

I claim as my invention:

1. In portable apparatus of the class described, a separating tank, a suction nozzle connected thereto, a suction pump for creating and maintaining a partial vacuum in said tank, a vertically-disposed centrally-located cylindrical screen within the said tank, an opening in the side of said tank for connection with said suction nozzle, an opening in the top of said tank through which said screen may be inserted and removed, a plate or cover secured to the upper end of said screen, a gasket between said plate and the top of said tank for making an air tight joint, means for securing said plate and compressing said gasket, a vertically-disposed oil drain pipe extending through the lower end of said tank, connected to said pump, and having its upper end within the lower end of said screen, and positioning means for the lower end of said screen secured to the bottom of said tank, and within the same.

2. In portable apparatus of the class described, a separating tank, a sediment tank having a lower drain, a screen in the separating tank dividing it into two chambers, a suction nozzle connected to said separating tank and adapted to deliver material into one of said chambers, an oil pipe leading from the other of said chambers to said sediment tank, and extending upwardly therein to a desired point, a suction pump adapted to create and maintain a partial vacuum, means for driving said pump, a pipe connecting said pump and said sediment tank, a fine mesh screen on the receiving end of said last-mentioned pipe and located within said sediment tank, and a storage tank connected to the discharge side of said pump for storing the reclaimed oil.

3. In portable apparatus of the class described: a separation tank; a movable suction nozzle connected to the upper portion thereof; screen means in said tank for separating solids and liquids delivered thereto from said nozzle; a sediment tank connected to said separation tank; a pump connected to said sediment tank and adapted to create a partial vacuum in said tanks and nozzle; and a storage tank connected to the discharge side of said pump.

4. In portable apparatus of the class described: a separation tank; a tubular screen vertically disposed in said tank; a movable suction nozzle connected to said tank and adapted to deliver a mixture of liquids and solids from a smudge pot into said tank on the outside of said screen; a sediment tank; a pipe connecting said tanks and leading from the inside of said screen to said sediment tank; a pump connected to the upper portion of said sediment tank and adapted to create a partial vacuum in said tanks and said nozzle; and a storage tank connected to the discharge side of said pump.

CHARLES D. ADAMS.